J. B. CORNWALL.
FEED REGULATOR.
APPLICATION FILED DEC. 1, 1915.
1,220,958.
Patented Mar. 27, 1917.
2 SHEETS—SHEET 1.
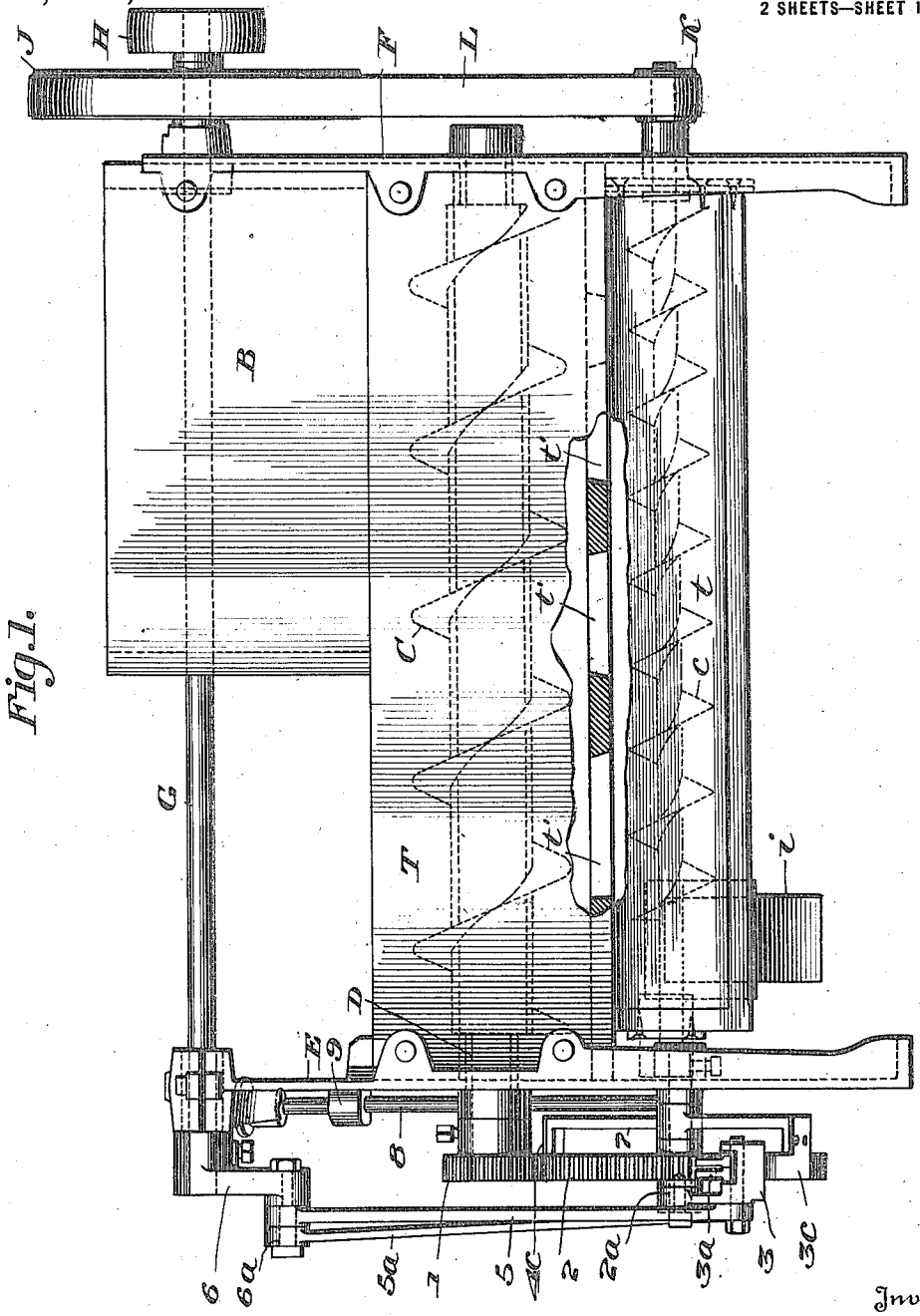
Fig. 1.
Witnesses
Inventor
John B. Cornwall
By 
Attorneys

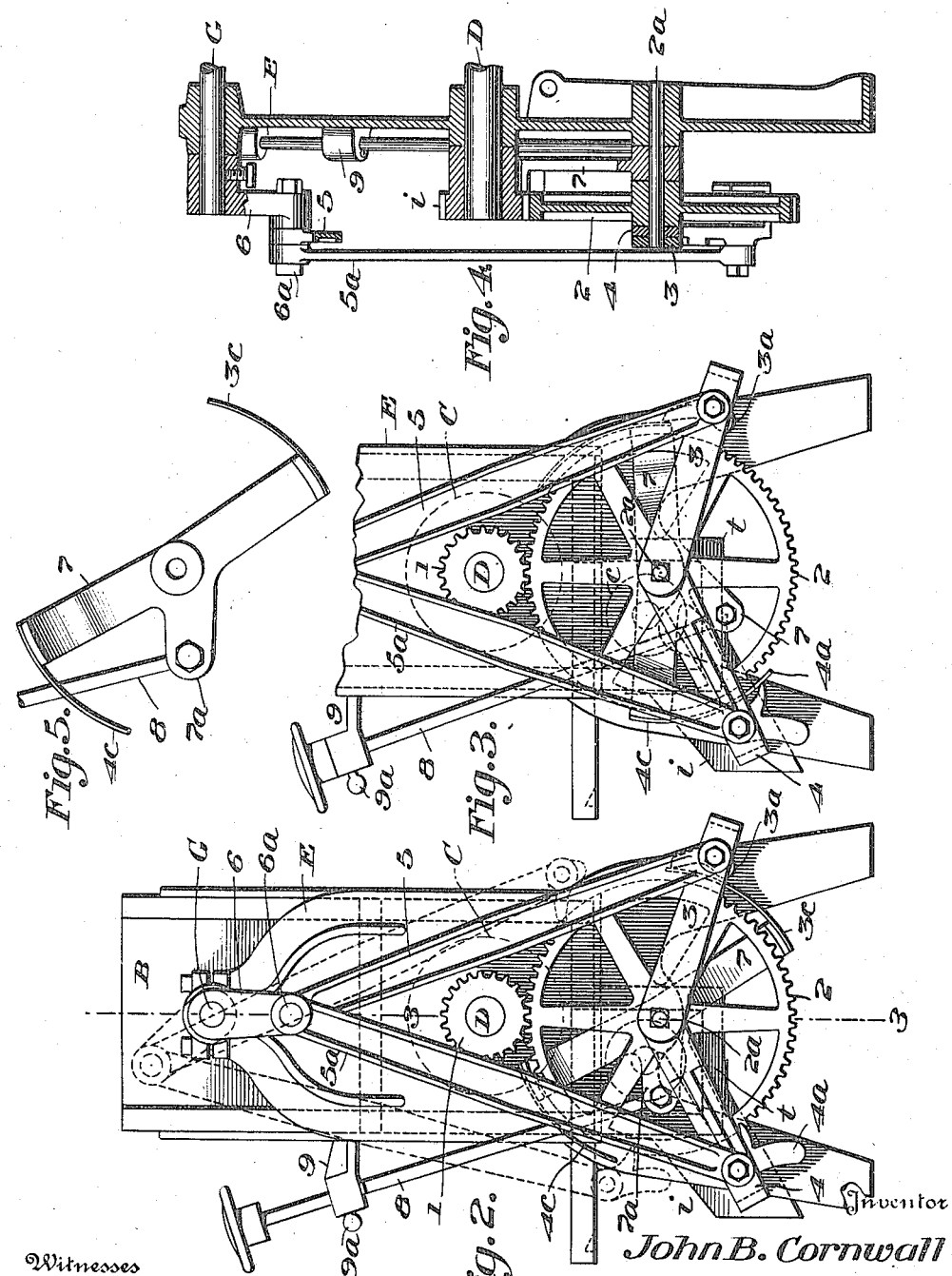

UNITED STATES PATENT OFFICE.

JOHN B. CORNWALL, OF MOLINE, ILLINOIS, ASSIGNOR TO BARNARD AND LEAS MANUFACTURING COMPANY, OF MOLINE, ILLINOIS, A CORPORATION OF ILLINOIS.

FEED-REGULATOR.

1,220,958.

Specification of Letters Patent.

Patented Mar. 27, 1917.

Application filed December 1, 1915. Serial No. 64,444.

*To all whom it may concern:*

Be it known that I, JOHN B. CORNWALL, a citizen of the United States, residing at Moline, in the county of Rock Island and State of Illinois, have invented certain new and useful Improvements in Feed-Regulators; and I hereby declare that the following is a full, clear, and exact description thereof, reference being had to the accompanying drawings, which form part of this specification.

This invention is a novel improvement in feed regulators, and has especial reference to machines for feeding granular substances, such as flour, meal, grain, etc. One of its objects is to enable the operator to change or regulate the amount of material being delivered by such a machine quickly, and at will, without stopping or changing the speed of the main driving shaft. Another object is to discharge the material from the machine in a practically continuous uniform stream although the material is discharged from the hopper into the machine irregularly or intermittently. Another object is to provide a cheaper, simpler and more conveniently operated feed regulator than has been heretofore made.

The invention is particularly useful in connection with machines intended to feed grain and its products in regulated uniform quantities; and is especially useful where several such machines are employed to blend or mix different grains or products in predetermined proportional quantities. In the usual type of feeding machines the variation of movement of the feeding element has been obtained by adjusting regulating screws, and this is a comparatively slow and troublesome operation, while my invention provides means whereby the desired variation of movement of the feeding element may be quickly and easily effected, and any desired variation, or extent of regulation, of the feed can be obtained.

Another feature of the invention is the provision of a secondary conveyer or feed device operating at a different and preferably a higher rate of speed than the primary conveyer or feed device, said secondary conveyer preferably running continuously, while the primary conveyer operates intermittently or variably. The product from the primary conveyer may be wholly or partially discharged at different points into the secondary conveyer and fed by the latter to the point of delivery, and any surplus material which might be carried over by the primary conveyer may also be discharged into the delivery with the material issuing from the secondary conveyer. This construction equalizes the stream of material issuing from the feeding machine and makes the delivery therefrom practically uniform and continuous.

I will explain and illustrate the invention as embodied in the machine illustrated in the drawings, and set forth in the claims the parts and combinations of parts for which protection is desired.

In said drawings:

Figure 1 is a side elevation of a feeder to which my invention is applied.

Fig. 2 is an end view thereof.

Fig. 3 is a detail view similar to Fig. 2 showing the parts in different positions.

Fig. 4 is a detail vertical section on the line 3—3 Fig. 2.

Fig. 5 is a detail.

The feeder illustrated in said drawings has a hopper B into which the material is fed, and said hopper discharges into an underlying trough in which is a primary conveyer C preferably a screw conveyer, mounted upon a shaft D which has bearings in the end frames E and F. Beneath the primary conveyer trough T, is a secondary conveyer trough $t$ in which is a worm conveyer $c$, mounted on a shaft journaled in suitable bearings in the end frames E—F of the feeder. The main trough T is preferably provided with a series of openings $t'$ in its bottom through which the material passes from the trough T into the trough $t$ at different points; the secondary trough $t$ has a discharge outlet $i$.

Journaled in the end frames E, F above the trough A is a shaft G which may be driven by a pulley H at one end, belted to any suitable source of power. Motion may be imparted from the shaft G to the secondary conveyer $c$ so as to operate this conveyer continuously by any suitable means. As shown a pulley J is mounted on the shaft G and a pulley K on the shaft, conveyer $c$, pulley K being driven by a belt L from pulley J.

The primary conveyer shaft is operated intermittently or irregularly according to the amount of material to be fed in a given time by novel mechanism as follows:

Secured to the end of the conveyer shaft D is a pinion 1 which meshes with a gear wheel 2 mounted upon a stud $2^a$ attached to the end frame E, preferably below the shaft D.

Pivoted on this stud $2^a$, preferably at the outer end of gear 2, are two oscillating levers 3 and 4. The oscillating lever 3 is pivotally connected to one end of a link 5, the other end of which is pivotally connected to a crank pin $6^a$ on a crank 6 fast to the shaft G. The lever 4 is pivotally connected to the lower end of a link $5^a$ the upper end of which is also pivotally connected to the crank pin $6^a$, so that when shaft G and crank 6 are rotated the levers 3 and 4 will be oscillated.

On the lever 3 is pivoted a pawl $3^a$ the tooth of which is adapted to engage the teeth of gear 2 when lever 3 rises. Pivoted on lever 4 is a pawl $4^a$ which is adapted to engage the teeth of gear 2 when the lever 4 is lowered. These pawls $3^a$ and $4^a$ alternately engage and operate gear 2, and both impart motion to the gear 2 in the same direction. The pawls $3^a$ and $4^a$ may be yieldingly held in engagement with the gear 2 by any suitable means; as shown they are weighted and held in engagement with the gear teeth by gravity. In the example shown the gear 2 is considerably larger in diameter than the pinion 1, consequently a considerable extent of rotation will be imparted to the conveyer C for a comparatively small extent of rotation of the gear 2.

In order to cause the pawls to certainly engage the gear 2 without the use of springs, the pawl $3^a$ is arranged to work more nearly at the top of the gear than the pawl $4^a$; this being accomplished by making the link 5 shorter than the link $5^a$. This enables me to locate the pawls $3^a$ and $4^a$ to move and operate in the positions where they will readily engage by gravity with the teeth of the gear 2.

The said mechanism will impart a substantially uniform vibration or reciprocation to the pawls $3^a$ and $4^a$ for each rotation of the crank, and in order to regulate or vary the extent of movement imparted by the pawls $3^a$, $4^a$ to the gear 2 the following devices are used:

Upon stud $2^a$, preferably at the inner end of the gear 2, is pivotally mounted a double armed oscillating lever 7, see Fig. 5, to the opposite ends of which are attached arc-shaped shields $3^c$ and $4^c$ respectively. These shields are constructed and arranged to lie close to and opposite the periphery of the gear 2, as shown, and may be so adjusted circumferentially of gear 2 as to extend more or less into the paths traversed by the pawls $3^a$, $4^a$ and thus hold the pawls $3^a$, $4^a$ out of engagement with the teeth of the gear 2 during any desired part, or all, of the strokes of the said pawls. The shields may be simultaneously adjusted to any desired position by shifting the lever 7; and this lever can be adjusted by means of a rod 8 pivotally connected at one end to an arm $7^a$ on the lever 7 and the other end of said rod extends through a guide 9 attached to the frame E and said rod can be locked to hold lever 7, in any adjusted position, by means of a set bolt or thumb screw $9^a$ tapped through the guide 9 as indicated in the drawings.

By shifting the lever 7 the shields $3^c$, $4^c$ can be shifted circumferentially of the gear 2 to any point desired in order to limit the number of teeth with which the pawls $3^a$, $4^a$ will operatively engage during their reciprocation. By these means while the shaft G may be operated continuously and uniformly the extent of motion imparted to the conveyer shaft D can be varied at will, without stopping the machine, by simply adjusting the rod 8 so as to move the shields $3^c$, $4^c$ more or less into the paths of the reciprocating pawls $3^a$, $4^a$.

The said regulating mechanism is cheap, simple, durable and practical and is especially useful where it is desired to blend materials each of which is delivered from an individual feeder.

When the machine is in operation the main or primary conveyer C will be operated intermittently or irregularly, while the secondary conveyer c will be operated continuously. The material from the hopper is discharged from the primary conveyer trough into the secondary conveyer trough and, as the secondary conveyer runs at a higher rate of speed and continuously, the product is practically delivered continuously from the machine by means of the secondary conveyer; but any material which may happen to pass to the end of the primary conveyer will be discharged into the secondary conveyer and escape through the opening $i$. Such machine is able to completely blend or equalize the material and discharge same in a continuous stream through the outlet $i$ although it is only drawn intermittently from the hopper A by the conveyer C.

It is common practice to arrange feeding machines in groups, and if for instance three kinds of materials are to be blended three such machines would be used, each one being arranged to discharge the desired proportion of the material fed thereby. Difficulty has heretofore been experienced with feeding machines where the feed or discharge is intermittent, as this renders it difficult to properly blend the products from the different machines, whereas with my construction the materials are fed from the hoppers of the several machines intermittently and in quantities regulated by the adjustment of the levers 7; yet such materials are discharged by the secondary conveyers from the respective machines in substantially uniform continuous streams which results in much more perfect and satisfactory blending of the different grades of material, where the machines are used in groups.

What I claim is:

1. In a feed regulator, the combination of a hopper, a primary discharging conveyer, a secondary discharging screw conveyer into which the primary conveyer discharges at a plurality of points in the length thereof, means for operating said primary conveyer intermittently and variably, and means for operating said secondary conveyer continuously.

2. In a feed regulator, the combination of a hopper, a primary conveyer discharging material from the hopper, a secondary screw conveyer into which the primary conveyer discharges at a plurality of points in the length thereof, means for operating the primary conveyer at variable speeds, and means for operating the secondary conveyer continuously and at higher speed than the primary conveyer.

3. In a feed regulator, the combination of a trough into which material is fed having a plurality of discharge openings at different points, a primary discharge in said trough, a secondary trough into which the material is discharged from the primary trough through said openings, a secondary discharge means operating in the secondary trough, means for changing the speed of the primary discharge means, and means for operating the secondary discharge means at uniform speed.

4. In a feed regulator, the combination of a hopper, a trough into which the hopper discharges having a plurality of discharge openings at different points, a primary conveyer in said trough, a secondary trough into which the material is discharged by the primary conveyer from said trough through said openings, a secondary conveyer in the secondary trough, means for operating the primary conveyer variably and intermittently, means for operating the secondary conveyer continuously at a higher speed than the primary conveyer, and means for changing the speed of the primary conveyer.

In testimony that I claim the foregoing as my own I affix my signature.

JOHN B. CORNWALL.